(12) United States Patent
Eun et al.

(10) Patent No.: US 9,180,899 B2
(45) Date of Patent: Nov. 10, 2015

(54) SHOPPING CART TRAY

(71) Applicants: Yoon Ku Eun, La Mirada, CA (US); Tea Joon Eun, La Mirada, CA (US); Dae Hyun Park, La Mirada, CA (US)

(72) Inventors: Yoon Ku Eun, La Mirada, CA (US); Tea Joon Eun, La Mirada, CA (US); Dae Hyun Park, La Mirada, CA (US)

( * ) Notice: Subject to any disclaimer, the term of this patent is extended or adjusted under 35 U.S.C. 154(b) by 37 days.

(21) Appl. No.: 14/149,737

(22) Filed: Jan. 7, 2014

(65) Prior Publication Data

US 2015/0191193 A1    Jul. 9, 2015

(51) Int. Cl.
*B62B 3/14*    (2006.01)

(52) U.S. Cl.
CPC ............ *B62B 3/1464* (2013.01); *B62B 3/1468* (2013.01)

(58) Field of Classification Search
CPC ............................ B62B 3/1464; B62B 3/1468
USPC .................... 224/411; 229/112, 108.1, 117.13
See application file for complete search history.

(56) References Cited

U.S. PATENT DOCUMENTS

| | | | | |
|---|---|---|---|---|
| 1,466,344 A | * | 8/1923 | Sardou | 229/120.17 |
| 3,650,383 A | * | 3/1972 | Nigro | 229/112 |
| 4,643,280 A | * | 2/1987 | Hensley | 190/11 |
| 4,801,077 A | * | 1/1989 | Sweatt et al. | 229/113 |
| 4,871,100 A | * | 10/1989 | Posner | 224/411 |
| 4,871,111 A | * | 10/1989 | Mode | 229/104 |
| 5,531,366 A | * | 7/1996 | Strom | 224/153 |
| 5,855,412 A | * | 1/1999 | Smith et al. | 297/256.17 |
| 5,918,798 A | * | 7/1999 | Frahm | 229/117.07 |
| 6,354,612 B1 | * | 3/2002 | Adamson | 280/33.992 |
| 6,517,155 B1 | * | 2/2003 | Landine | 297/256.17 |
| 6,766,931 B2 | * | 7/2004 | Wolf | 224/411 |
| 7,134,674 B2 | * | 11/2006 | Frommherz | 280/33.992 |
| 7,374,182 B2 | * | 5/2008 | Gurley et al. | 280/33.993 |
| 7,398,977 B2 | * | 7/2008 | Short | 280/33.992 |
| 7,992,879 B2 | * | 8/2011 | Eisenberg et al. | 280/33.992 |
| 8,783,697 B1 | * | 7/2014 | Wilhite | 280/33.992 |
| 2006/0001225 A1 | * | 1/2006 | Gurley et al. | 280/33.992 |
| 2008/0012253 A1 | * | 1/2008 | Short | 280/33.992 |
| 2008/0283441 A1 | * | 11/2008 | Zetteler | 206/557 |
| 2009/0092342 A1 | * | 4/2009 | Rolim de Oliveira | 383/7 |
| 2010/0194064 A1 | * | 8/2010 | Simonson et al. | 280/47.35 |
| 2011/0089651 A1 | * | 4/2011 | De Bessa Camargo E Andrade | 280/33.992 |
| 2011/0198376 A1 | * | 8/2011 | Oh | 224/411 |
| 2012/0118941 A1 | * | 5/2012 | Wang | 229/112 |
| 2014/0084036 A1 | * | 3/2014 | Hemann | 224/411 |
| 2015/0076199 A1 | * | 3/2015 | Granvle | 224/411 |

FOREIGN PATENT DOCUMENTS

| | | | |
|---|---|---|---|
| DE | 19543066 A1 | * | 5/1997 |
| DE | 29802557 U1 | * | 4/1998 |
| DE | 202011003045 U1 | * | 5/2011 |

(Continued)

*Primary Examiner* — Justin Larson
(74) *Attorney, Agent, or Firm* — John K. Park; Park Law Firm

(57) ABSTRACT

A shopping cart tray includes a trapezoidal bottom plate, a front plate, a rear plate, and right and left side plates. The trapezoidal bottom plate is configured to fit in a loading space of a shopping cart. The front plate extends from a front side of the trapezoidal bottom plate. The rear plate extends from a rear side of the trapezoidal bottom plate. The right side plate extends from a right side of the trapezoidal bottom plate. The left side plate extends from a left side of the trapezoidal bottom plate. The shopping cart tray fits into the shopping cart and maximize a usage of the loading space. The dimension of the trapezoidal bottom plate is slightly smaller than a dimension of the loading space of the shopping cart.

14 Claims, 5 Drawing Sheets

(56) References Cited

FOREIGN PATENT DOCUMENTS

| DE | 202011004831 U1 | * | 10/2011 |
| EP | 623500 B1 | * | 7/1997 |
| EP | 2221231 A1 | * | 8/2010 |
| FR | 2935334 A1 | * | 3/2010 |
| WO | WO 2008008164 A3 | * | 8/2008 |

* cited by examiner

SHOPPING CART TRAY

BACKGROUND OF THE INVENTION

The present invention relates to a shopping cart tray. More particularly, this invention relates to a shopping cart tray, which maximize the usage of space of a shopping cart tray.

As the concerns of environment grow in the community, some plastic wastes from shopping have become a big problem. Therefore, many innovations have been suggested for a while already.

Accordingly, a need for a shopping cart tray has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a shopping cart tray.

An aspect of the invention provides a shopping cart tray including a trapezoidal bottom plate, a front plate, a rear plate, and right and left side plates.

The trapezoidal bottom plate is configured to fit in a loading space of a shopping cart.

The front plate extends from a front side of the trapezoidal bottom plate.

The rear plate extends from a rear side of the trapezoidal bottom plate.

The right side plate extends from a right side of the trapezoidal bottom plate.

The left side plate extends from a left side of the trapezoidal bottom plate.

The shopping cart tray is configured to fit into the shopping cart and maximize a usage of the loading space.

The dimension of the trapezoidal bottom plate may be slightly smaller than a dimension of the loading space of the shopping cart.

Each of the front plate, the rear plate, the right side plate, and the left side plate may be substantially vertical.

Alternatively, each of the front plate, the rear plate, the right side plate, and the left side plate may be tilted outwards by a predetermined angle, such that the shopping cart tray is adapted to be partially fit in and stacked vertically.

The predetermined angle may be about 15 degrees.

The trapezoidal bottom plate may be fit into substantially entire bottom surface of the loading space of the shopping cart.

The trapezoidal bottom plate may be fit into a partial bottom surface of the loading space of the shopping cart.

The shopping cart tray may be made of paper. Alternatively, the shopping cart tray may be made of plastic or wood.

The shopping cart tray may further comprise a central folding line provided in a middle portion of the trapezoidal bottom plate, which enables for the shopping cart tray to be folded by halves, facilitating stacking of the shopping cart tray.

The meeting lines among the trapezoidal bottom plate, the front plate, the rear plate, the right side plate, and the left side plate may be slightly foldable.

The shopping cart tray may further comprise two groove-cuts provided along a top edge of the front plate.

Another aspect of the invention provides a shopping cart tray set comprising a first tray and a second tray.

The first tray comprises a first trapezoidal bottom plate, a first front plate, a first rear plate, a first right side plate, and a first left side plate.

The second tray comprises a second trapezoidal bottom plate, a second front plate, a second rear plate, a second right side plate, and a second left side plate.

The rear plate of the first tray has a substantially same and matching size as the front plate of the second tray.

Each of the first and second front plates, the first and second rear plates, the first and second right side plates, and the first and second left side plates may be tilted outwards by a predetermined angle, such that the shopping cart tray set is adapted to be stacked vertically.

The predetermined angle may be about 15 degrees.

The shopping cart tray set may further comprise one or more handle holes through side plates.

The advantages of the present invention are: (1) the shopping cart tray according to the invention is simple to make; and (2) the shopping cart tray enables an efficient usage of space in a shopping cart.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
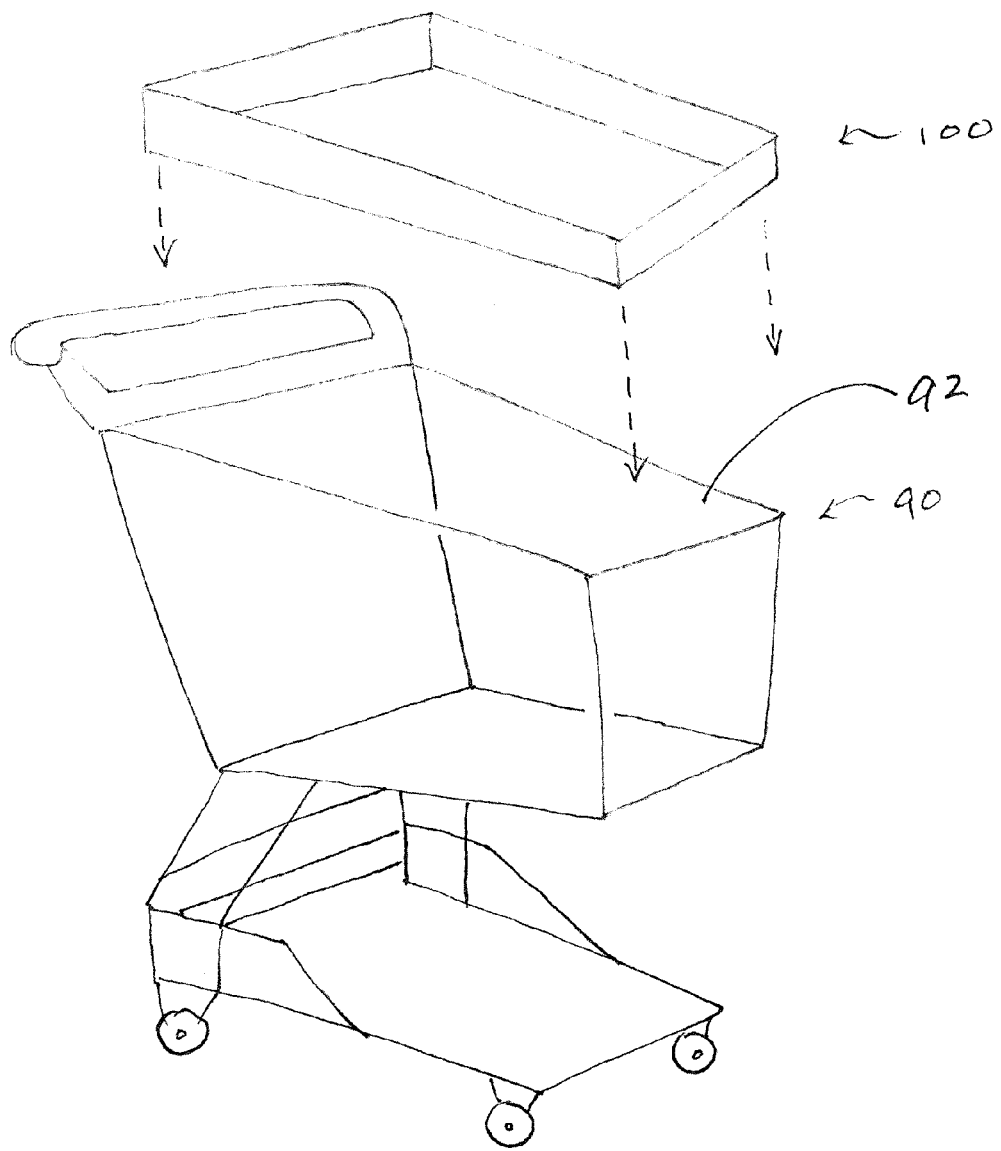
FIG. 1 is a perspective view showing a shopping cart tray according to an embodiment of the invention.
Figure 2:
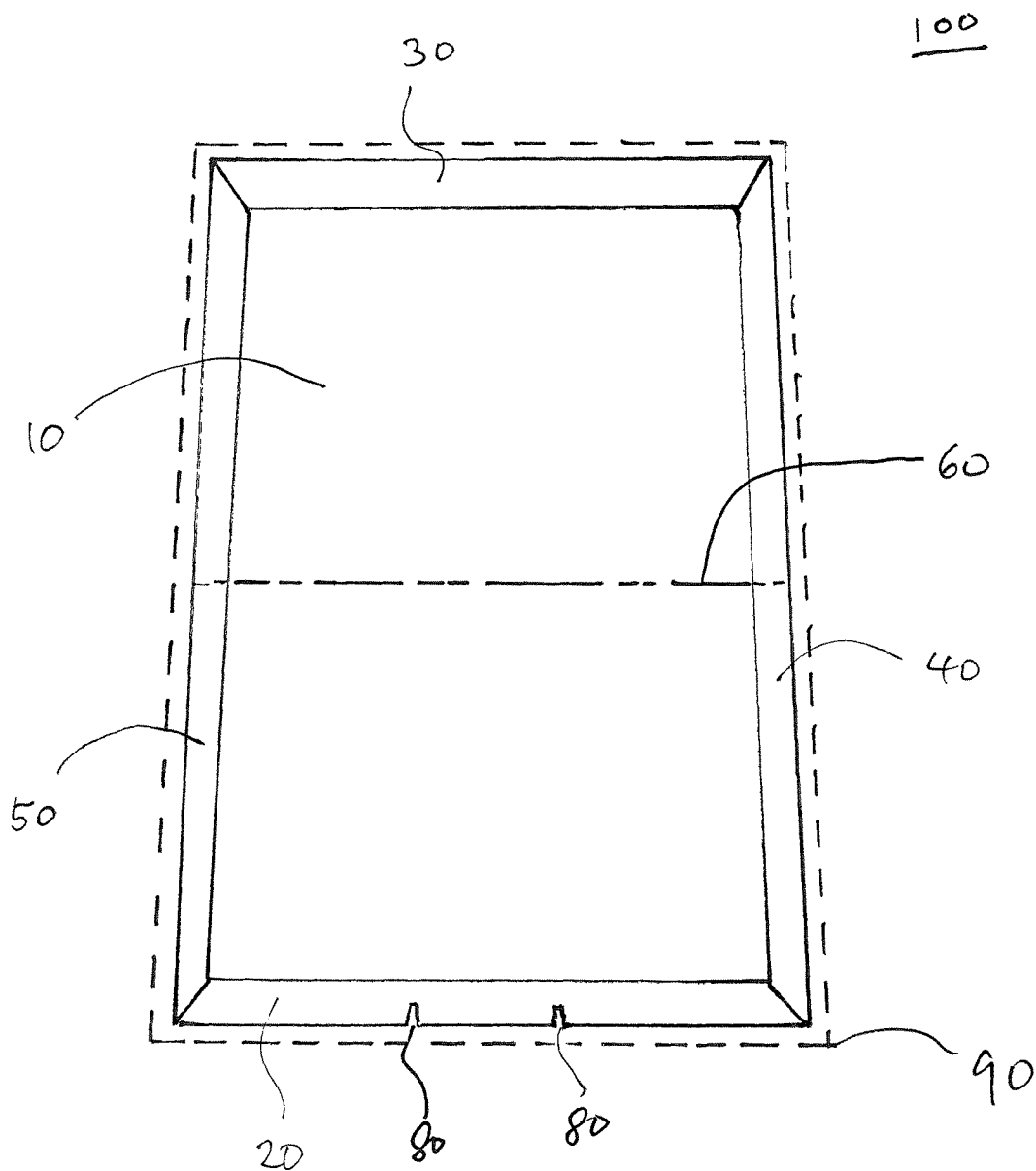
FIG. 2 is a top plan view of the shopping cart tray of FIG. 1.
Figure 3:
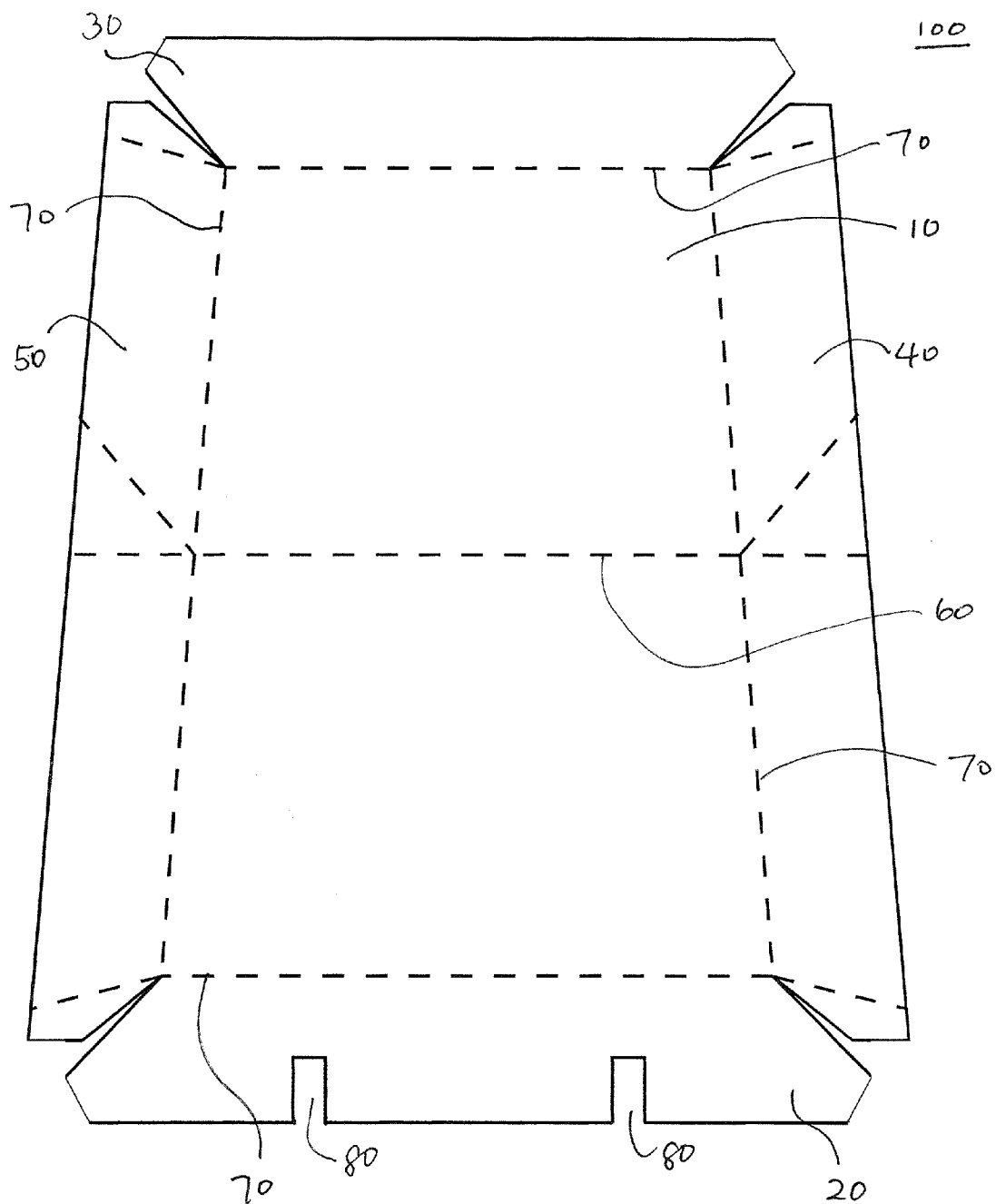
FIG. 3 is a base template view of the shopping cart tray of FIG. 2.

As shown in FIGS. 1-3, an aspect of the invention provides a shopping cart tray 100 including a trapezoidal bottom plate 10, a front plate 20, a rear plate 30, and right and left side plates 40, 50.

The trapezoidal bottom plate 10 is configured to fit in a loading space 92 of a shopping cart 90 as shown in FIGS. 1 and 2.

The front plate 20 extends from a front side of the trapezoidal bottom plate 10.

The rear plate 30 extends from a rear side of the trapezoidal bottom plate 10.

The right side plate 40 extends from a right side of the trapezoidal bottom plate 10.

The left side plate 50 extends from a left side of the trapezoidal bottom plate 10.

The shopping cart tray 100 is configured to fit into the shopping cart 90 and maximize a usage of the loading space 92 as shown in FIG. 1.

The dimension of the trapezoidal bottom plate 10 may be slightly smaller than a dimension of the loading space 92 of the shopping cart 90 as shown in FIG. 2.

Each of the front plate 20, the rear plate 30, the right side plate 40, and the left side plate 50 may be substantially vertical.

Alternatively, each of the front plate 20, the rear plate 30, the right side plate 40, and the left side plate 50 may be tilted outwards by a predetermined angle, such that the shopping cart trays 100 are adapted to be partially fit in and stacked vertically on top of each other.

The predetermined angle may be from about 15 degrees to about 45 degrees. Preferably, the predetermined angle may be about 15 degrees. Alternatively, the predetermined angle may be about 45 degrees.

The trapezoidal bottom plate 10 may be fit into substantially entire bottom surface of the loading space 92 of the shopping cart 90.

The trapezoidal bottom plate 10 may be fit into a partial bottom surface of the loading space 92 of the shopping cart 90.

The shopping cart tray 100 may be made of paper. Alternatively, the shopping cart tray 100 may be made of plastic or wood or any material, for that matter.

The shopping cart tray 100 may further comprise a central folding line 60 provided in a middle portion of the trapezoidal bottom plate 10, which enables for the shopping cart tray 100 to be folded by halves, facilitating stacking of the shopping cart tray 100. Of course, the central folding line 60 may extend further into the side plates 40, 50 as shown in FIG. 3.

The meeting lines 70 among the trapezoidal bottom plate 10, the front plate 20, the rear plate 30, the right side plate 40, and the left side plate 50 may be slightly foldable. That way, once folded, a plurality of shopping cart trays 100 can be stacked more space-efficiently.

The shopping cart tray 100 may further comprise two or more groove-cuts 80 provided along a top edge of the front plate 20. The two or more groove-cuts 80 help the shopping cart tray 100 to be kept from shaking or crushing.

In certain embodiments, the shopping cart tray 100 may be made of clay coated news back, clay coated gray back, clay coated kraft back, plastic corrugate, corrugated paper board, or plastic coated kraft back.

Figure 4:
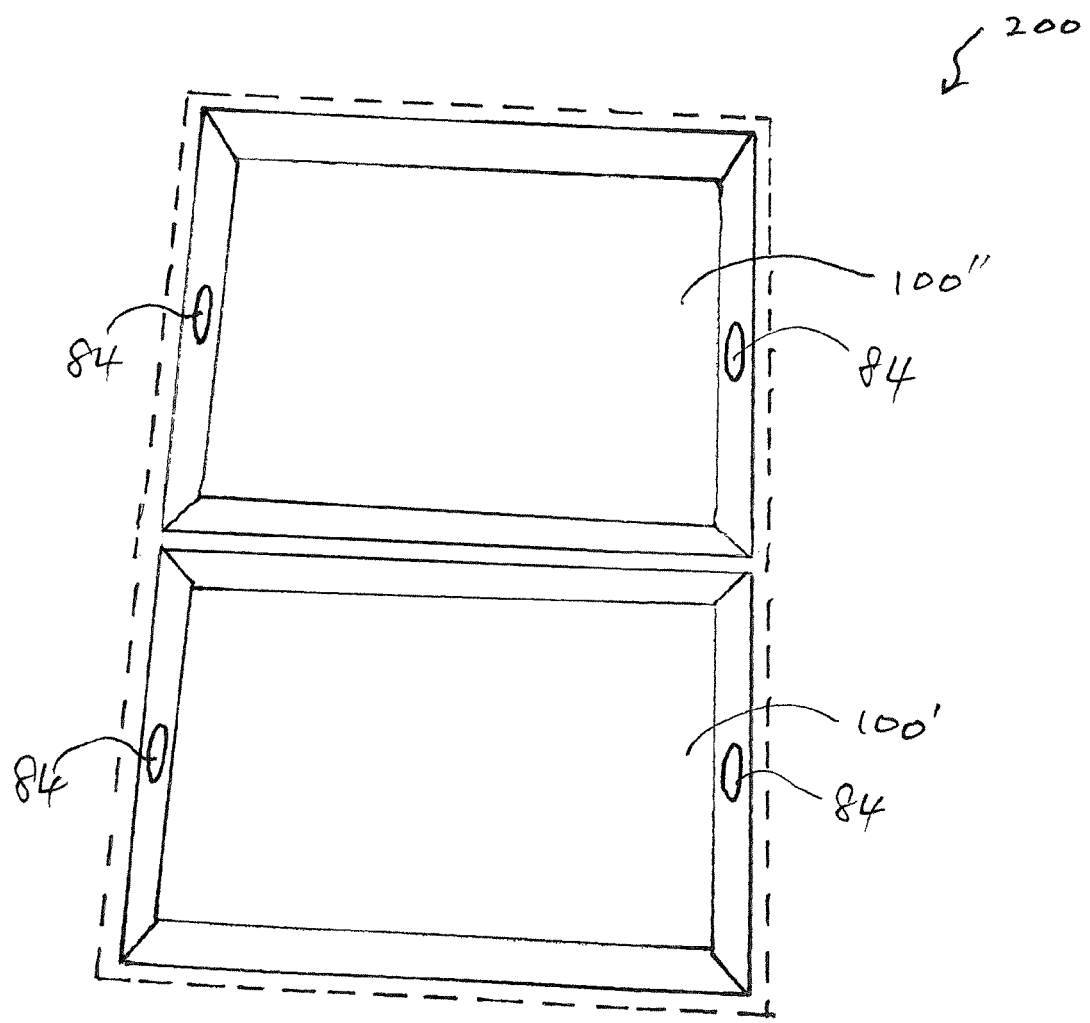
FIG. 4 is a view showing a shopping cart tray set according to another embodiment of the invention.
Figure 5:
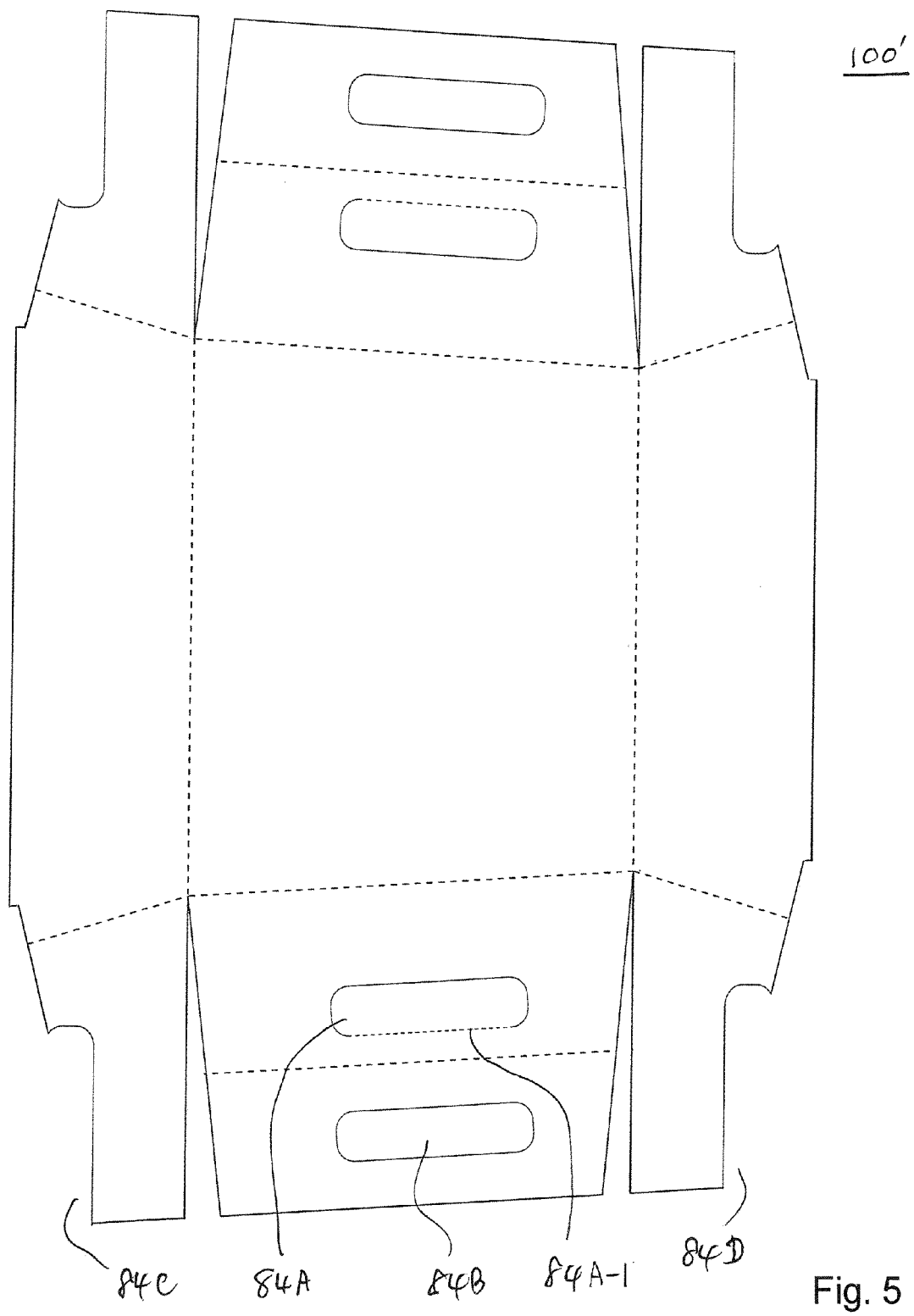
FIG. 5 is a base template view of the shopping cart tray set of FIG. 4.

As shown in FIGS. 4 and 5, another aspect of the invention provides a shopping cart tray set 200 comprising a first tray 100' and a second tray 100".

The first tray 100' comprises a first trapezoidal bottom plate, a first front plate, a first rear plate, a first right side plate, and a first left side plate as in the shopping cart tray 100, as shown in FIG. 5.

Likewise, the second tray 100" comprises a second trapezoidal bottom plate, a second front plate, a second rear plate, a second right side plate, and a second left side plate.

The rear plate of the first tray 100' has a substantially same and matching size as the front plate of the second tray 100".

Each of the first and second front plates, the first and second rear plates, the first and second right side plates, and the first and second left side plates may be tilted outwards by a predetermined angle, such that the shopping cart tray set is adapted to be stacked vertically.

The predetermined angle may be about 15 to 45 degrees.

The shopping cart tray set may further comprise one or more handle holes 84 through side plates as shown in FIGS. 4 and 5.

The handle hole 84 may comprise or be made from partial holes 84A, 84B, 84C, 84D as shown in FIG. 5.

All the partial holes 84A, 84B, 84C, 84D are going to be folded into one, forming the handle hole 84.

Especially, the partial hole 84A is not cut out like others, but the original part is still connected to the rest of the side plate 40, 50 through folding line 84A-1.

In FIGS. 3 and 5, the development figures, the dotted lines stand for folding lines for building the 3D structure out of the plane.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A shopping cart tray comprising:
a trapezoidal bottom plate configured to fit in a loading space of a shopping cart;
a front plate extending from a front side of the trapezoidal bottom plate;
a rear plate extending from a rear side of the trapezoidal bottom plate;
a right side plate extending from a right side of the trapezoidal bottom plate;
a left side plate extending from a left side of the trapezoidal bottom plate; and
a central folding line provided in a middle portion of the trapezoidal bottom plate, which enables for the shopping cart tray to be folded by halves, facilitating stacking of a plurality of shopping cart trays,
wherein the shopping cart tray is configured to fit into the shopping cart and maximize a usage of the loading space,
wherein each of the front plate, the rear plate, the right side plate, and the left side plate is tilted outwards by a predetermined angle, such that a plurality of shopping cart trays are adapted to be partially fit in and stacked vertically.

2. The shopping cart tray of claim 1, wherein a dimension of the trapezoidal bottom plate is slightly smaller than a dimension of the loading space of the shopping cart.

3. The shopping cart tray of claim 1, wherein the predetermined angle is about 15 degrees.

4. The shopping cart tray of claim 1, wherein the trapezoidal bottom plate is fit into substantially entire bottom surface of the loading space of the shopping cart.

5. The shopping cart tray of claim 1, wherein the trapezoidal bottom plate is fit into a partial bottom surface of the loading space of the shopping cart.

6. The shopping cart tray of claim 1, wherein the shopping cart tray is made of paper.

7. The shopping cart tray of claim 1, wherein the shopping cart tray is made of plastic or wood.

8. The shopping cart tray of claim 1, wherein meeting lines among the trapezoidal bottom plate, the front plate, the rear plate, the right side plate, and the left side plate are slightly foldable.

9. The shopping cart tray of claim 1, further comprising two groove-cuts provided along a top edge of the front plate.

10. The shopping cart tray of claim 1, wherein the predetermined angle is from about 15 degrees to about 45 degrees.

11. The shopping cart tray of claim 10, wherein the predetermined angle is about 30 degrees.

12. A shopping cart tray set comprising:
a first tray comprising:
a first trapezoidal bottom plate configured to fit in a front portion of a loading space of a shopping cart;
a first front plate extending from a front side of the first trapezoidal bottom plate;

a first rear plate extending from a rear side of the first trapezoidal bottom plate;

a first right side plate extending from a right side of the first trapezoidal bottom plate;

a first left side plate extending from a left side of the first trapezoidal bottom plate; and a first central folding line provided in a middle portion of the first trapezoidal bottom plate, which enables for the first tray to be folded by halves, facilitating stacking of first trays, wherein the first tray is configured to fit into the front portion of the shopping cart and maximize a usage of the loading space, and a second tray comprising:

a second trapezoidal bottom plate configured to fit in a rear portion of a loading space of a shopping cart;

a second front plate extending from a front side of the second trapezoidal bottom plate;

a second rear plate extending from a rear side of the second trapezoidal bottom plate;

a second right side plate extending from a right side of the second trapezoidal bottom plate;

a second left side plate extending from a left side of the second trapezoidal bottom plate; and a second central folding line provided in a middle portion of the second trapezoidal bottom plate, which enables for the second tray to be folded by halves, facilitating stacking of second trays, wherein the second tray is configured to fit into the rear portion of the shopping cart and maximize a usage of the loading space, wherein the rear plate of the first tray has a substantially same and matching size as the front plate of the second tray, wherein each of the first and second front plates, the first and second rear plates, the first and second right side plates, and the first and second left side plates is tilted outwards by a predetermined angle, such that the shopping cart tray set is adapted to be stacked vertically.

13. The shopping cart tray set of claim 12, wherein the predetermined angle is about 15 degrees.

14. The shopping cart tray set of claim 12, further comprising one or more handle holes through side plates, wherein the each of the one or more handle holes is made of folded double layers of the side plate.

\* \* \* \* \*